US011165816B2

(12) United States Patent
Torgerson et al.

(10) Patent No.: US 11,165,816 B2
(45) Date of Patent: Nov. 2, 2021

(54) CUSTOMIZED SERVICE REQUEST PERMISSION CONTROL SYSTEM

(71) Applicant: Walmart Apollo, LLC, Bentonville, AR (US)

(72) Inventors: Troy Torgerson, Rogers, AR (US); Kieron Brophy, Boca Raton, FL (US); James Robinson, Bentonville, AR (US); Vidhi Gavadia, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 397 days.

(21) Appl. No.: 16/370,583

(22) Filed: Mar. 29, 2019

(65) Prior Publication Data

US 2019/0306189 A1    Oct. 3, 2019

Related U.S. Application Data

(60) Provisional application No. 62/652,053, filed on Apr. 3, 2018.

(51) Int. Cl.
*H04L 29/06* (2006.01)
*H04L 9/32* (2006.01)
*H04L 12/24* (2006.01)

(52) U.S. Cl.
CPC ........ *H04L 63/1458* (2013.01); *H04L 9/3213* (2013.01); *H04L 41/0273* (2013.01); *H04L 63/10* (2013.01); *H04L 2209/08* (2013.01)

(58) Field of Classification Search
None
See application file for complete search history.

(56) References Cited

U.S. PATENT DOCUMENTS 6,160,875 A * 12/2000 Park ...................... H04M 3/365
379/111
6,418,148 B1 * 7/2002 Kumar .............. H04W 72/0413
370/330

(Continued)

OTHER PUBLICATIONS

Kung et al.; A practical System for Guaranteed Access in the Presence of DDoS Attacks and Flash Crowds; 2015; retrieved from the Internet; https://ieeexplore.ieee.org/abstract/document/7437130; pp. 1-12 as printed. (Year: 2015).*

(Continued)

*Primary Examiner* — Michael W Chao

(57) ABSTRACT

Examples provide a permission service for controlling service requests to web services. A permission controller monitors the number of active requests to a selected web service. When a permission request associated with the selected web service is received from a client, the permission service compares the current number of active requests to a per-service maximum threshold number of active requests. The permission controller maintains a per-threshold number of active requests customized for each web service. If the current request would exceed the threshold number if granted, the permission controller sends a denial with a random wait time to the client. The client resends the permission request on expiration of the wait time. The permission controller generates a different random wait time for each denial response. If the number of active requests is less than or equal to the threshold, the permission service grants permission to the client.

16 Claims, 13 Drawing Sheets

(56) References Cited

U.S. PATENT DOCUMENTS

| | | | | |
|---|---|---|---|---|
| 6,789,203 B1* | 9/2004 | Belissent | H04L 47/10 | 370/229 |
| 6,816,901 B1* | 11/2004 | Sitaraman | H04L 63/101 | 709/217 |
| 6,836,785 B1* | 12/2004 | Bakshi | H04L 47/28 | 709/203 |
| 7,404,205 B2* | 7/2008 | Scoredos | H04L 63/0254 | 709/228 |
| 7,870,267 B2* | 1/2011 | Gilfix | H04L 67/148 | 709/227 |
| 8,463,887 B2* | 6/2013 | Rajan | H04L 47/32 | 709/223 |
| 8,516,084 B1* | 8/2013 | Grieve | H04L 69/28 | 709/219 |
| 8,631,149 B2 | 1/2014 | Kamath et al. | | |
| 9,350,734 B1* | 5/2016 | Jamshidi | H04L 63/1458 | |
| 9,379,997 B1 | 6/2016 | Vosshall et al. | | |
| 9,652,306 B1 | 5/2017 | Wagner et al. | | |
| 9,692,820 B2* | 6/2017 | Chaudhary | H04L 67/1002 | |
| 9,705,959 B1 | 7/2017 | Strand et al. | | |
| 2002/0099831 A1* | 7/2002 | Tsunogai | H04L 69/14 | 709/227 |
| 2004/0233927 A1* | 11/2004 | Hirosawa | H04L 12/413 | 370/445 |
| 2005/0027948 A1* | 2/2005 | Marlan | H04L 43/16 | 711/150 |
| 2008/0250419 A1* | 10/2008 | Kasten | H04L 67/32 | 718/104 |
| 2010/0274893 A1* | 10/2010 | Abdelal | H04L 47/10 | 709/224 |
| 2011/0153839 A1* | 6/2011 | Rajan | H04L 69/16 | 709/227 |
| 2013/0055269 A1* | 2/2013 | Sukenari | G06F 9/467 | 718/101 |
| 2013/0143615 A1 | 6/2013 | Juang et al. | | |
| 2013/0304604 A1 | 11/2013 | Hoffman et al. | | |
| 2014/0153422 A1 | 6/2014 | Nambiar et al. | | |
| 2014/0259163 A1* | 9/2014 | Wei | H04L 63/1466 | 726/22 |
| 2015/0173073 A1* | 6/2015 | Lindoff | H04W 24/02 | 370/329 |
| 2016/0179711 A1 | 6/2016 | Oikarinen et al. | | |
| 2016/0197997 A1 | 7/2016 | Fossen | | |

OTHER PUBLICATIONS

Young, Lee W., "International Search Report", International Application No. PCT/US2019/024677, dated Jun. 28, 2019, 2 pages.

Young, Lee W., "Written Opinion", International Application No. PCT/US2019/024677, dated Jun. 28, 2019, 6 pages.

Unknown, "Is Your Node Process Too Busy?," NPM Enterprise, https://www.npmjs.com/package/toobusy-js, accessed Mar. 26, 2019, 7 pages.

Unknown, "Node.js Introduction," w3schools.com, https://www.w3schools.com/nodejs/nodejs_intro.asp, accessed Mar. 26, 2019, 6 pages.

* cited by examiner

CUSTOMIZED SERVICE REQUEST PERMISSION CONTROL SYSTEM

BACKGROUND

A web service is a server-side platform providing client access to applications or other services via a network, such as, but not limited to, the Internet. A web service may sometimes receive hundreds or thousands of service requests from clients, which may overwhelm the web service resulting in slow response time, increasing lag times for requests waiting in a queue, or the web service may stop working altogether. A load balancer is a management tool distributing service requests among multiple servers to prevent overloading a single server. A gatekeeper is another solution that grants or denies each client access to a web service. If the gatekeeper denies the client access to the web service, the client is unable to reach or access/communicate with the web service. However, load balancers and gatekeepers consume significant processor resources and may increase request lag time. Moreover, these current solutions are frequently unable to handle sudden increases in traffic due to unpredicted bursts of interest/increased utilization of the web service and/or malicious denial of service (DOS) attacks.

SUMMARY

Some examples provide a system for customized request permission control. The system includes a memory and at least one processor communicatively coupled to the memory. A request monitor component receives a permission request associated with a selected web service from a client via a network. A request authorization component compares a current number of active requests to the selected web service with a threshold maximum number of active requests assigned to the selected web service. A permission component generates a permission response to the client via the network. If the threshold maximum number of active requests exceeds the current number of active requests to the selected web service, the permission component increments the current number of active requests to the selected web service. The permission response grants the client permission to send a service request to the selected web service. A randomizer component generates a random wait time interval associated with the selected web service. If the current number of active requests to the selected web service exceeds the threshold maximum number of active requests, a notification component sends a permission denial response with the random wait time interval to the client. The permission denial response denies the client permission to send the service request to the selected web service. The permission denial response includes an instruction to the client to wait the random wait time prior to resending the permission request back to the request monitor component.

Other examples provide a computer-implemented method for customized request permission control. A communications interface component receives a first permission request associated with a first web service from a first client device and a second permission request associated with a second web service from a second client device via a network. If a first threshold number of active requests for the first web service exceeds a first counter value indicating a current number of active requests associated with the first web service, a permission component sends a first permission response to the first client device. The permission response grants permission to send a service request to the first web service. A randomizer component generates a first random wait time for the first client device to wait prior to resending the first permission request. If the first counter value exceeds the first threshold maximum active requests, a first denial response is output to the first client device. The denial response includes the first random wait time. If a second threshold maximum active requests associated with the second web service exceeds a second counter value indicating the current number of active requests associated with the second web service, the permission component sends a second permission response to the second client device. The randomizer component generates a second random wait time. If the second counter value exceeds the second threshold maximum active requests A second denial response is output to the second client device with a second random wait time.

Still other examples provide a computer-implemented method for service request permission control. The permission request component generates a first permission request associated with a selected web service. The first permission request is sent to a permission server associated with the selected web server via a network. If a denial response is received from the permission server, a second permission request is sent to the permission server after occurrence of a wait time interval. If a permission response associated with the permission request is received from the permission server, a service request component outputs a service request to the selected web service. A notification component generates a release notification to the permission server on condition the service request to the web services server is completed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
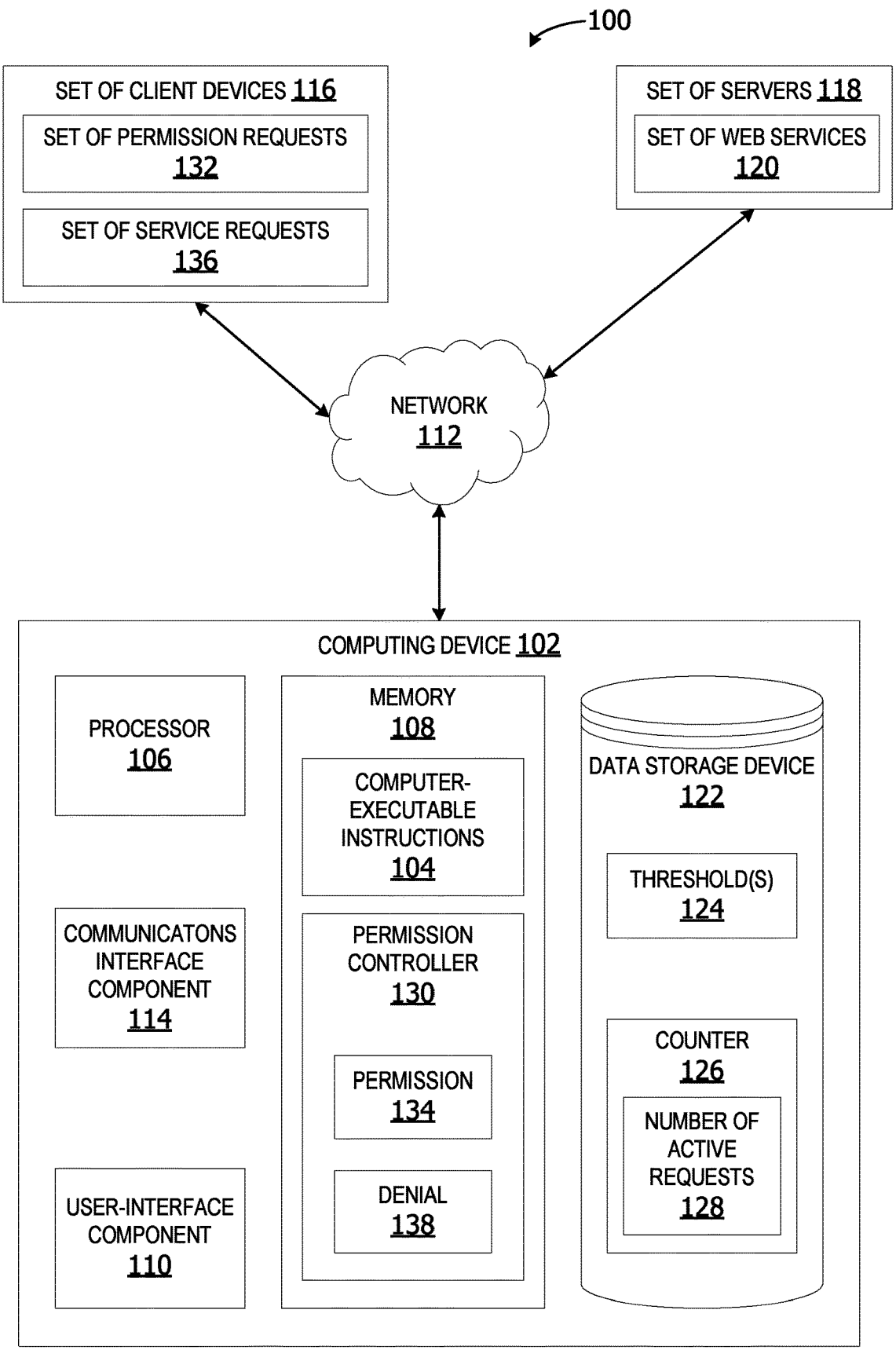
FIG. 1 is an exemplary block diagram illustrating a system for service request permission control.

Referring to the figures, examples of the disclosure enable a permission controller service for controlling service requests to one or more web services. In some examples, a permission controller compares a threshold value for a selected service with a counter value associated with the selected service to determine whether to grant permission to one or more clients requesting permission to send a request to the selected service. If the counter value is less than or equal to the threshold value, the permission controller grants the request. The threshold is a per-service value customized for each web service based on the number of requests the web service is typically able to handle without performance lag/service failure. The threshold value may also be customized based on the amount of resources typically required to respond to each request. If service requests are typically processor intensive, the threshold value is lower than if responses to service requests are less resource intensive. This enables faster web service request handling and reduced processor load for web services servers.

In other examples, the permission controller enables throttling of service requests without blocking client access to a web service or load balancing. The permission controller regulates the number of service requests without interfering with interactions between the clients and the web services. The permission controller service prevents server restarts, shutdowns, and/or freezing up due to too many requests, such as, but not limited to, a sudden burst of five thousand service requests coming in simultaneously and causing the system to restart. This enables more efficient service request handling, reduced lag time, increased web service performance, faster web service request resolution, and improved service response time while preventing web services from becoming overwhelmed by too many service requests.

The permission controller in other examples generates a random wait time for clients receiving a permission denial. The random wait time specifies a random amount of time for a client to wait prior to resubmitting a permission request. The random wait time prevents the permission controller from being overwhelmed by permission requests while conserving memory, reducing processor load and reducing network bandwidth usage by requesting clients.

Other examples provide a permission server implementing a permission controller which is agnostic regarding the web services the permission service is throttling. The permission controller is portable and works on any operating system where NODE.JS® runs. The permission service is also flexible and may be adjusted to whatever environment it is running on (server size, processor count, etc.). The permission controller is extendable and may easily be extended to manage multiple services. In other words, a single permission controller may be tasked to manage throttle requests to multiple different web services.

The permission controller service extends the usefulness of NODE.JS® and is inexpensive to implement. The maintenance costs associated with the permission service are almost negligible. This reduces costs and improves efficiency regarding providing web services to clients and utilizing web services provided in client-server frameworks.

The permission controller service in still other examples sends a permission token to a client when the permission controller grants the clients permission request. The web service only responds to requests which are accompanied by the permission token. The selected web service ignores any web service request received from the client without the permission token. This prevents DOS attacks by enabling the web services server to ignore incoming requests which are unaccompanied by a permission token. The permission service throttles the number of requests/rate at which requests are received by a web services server to prevent the server from being overwhelmed and/or shutting down due to DOS attacks.

Referring again to FIG. 1, an exemplary block diagram illustrates a system 100 for service request permission control. In the example of FIG. 1, the computing device 102 represents any device executing computer-executable instructions 104 (e.g., as application programs, operating system functionality, or both) to implement the operations and functionality associated with the computing device 102. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as servers, desktop personal computers, kiosks, or tabletop devices. Additionally, the computing device 102 may represent a group of processing units or other computing devices.

In some examples, the computing device 102 has at least one processor 106 and a memory 108. The computing device 102 may optionally also include a user interface component 110.

The processor 106 includes any quantity of processing units and is programmed to execute the computer-executable instructions 104. The computer-executable instructions 104 may be performed by the processor 106 or by multiple processors within the computing device 102 or performed by a processor external to the computing device 102. In some examples, the processor 106 is programmed to execute instructions such as those illustrated in the figures (e.g., FIG. 10, FIG. 11 and FIG. 12).

The computing device 102 further has one or more computer readable media such as the memory 108. The memory 108 includes any quantity of media associated with or accessible by the computing device 102. The memory 108 may be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications may communicate with counterpart applications or services such as web services accessible via a network 112. For example, the applications may represent downloaded client-side applications that correspond to server-side services executing in a cloud.

In other examples, the user interface component 110 includes a graphics card for displaying data to the user and receiving data from the user. The user interface component 110 may also include computer-executable instructions (e.g., a driver) for operating the graphics card. Further, the user interface component 110 may include a display (e.g., a touch screen display or natural user interface) and/or computer-executable instructions (e.g., a driver) for operating the display. The user interface component 110 may also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. For example, the user may input commands or manipulate data by moving the computing device 102 in a particular way.

The network 112 is implemented by one or more physical network components, such as, but without limitation, routers, switches, network interface cards (NICs), and other network devices. The network 112 may be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 may be a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to the one or more clients in a set of client devices 116 and/or the one or more servers in a set of servers 118, may occur using any protocol or mechanism over any wired or wireless connection. In some examples, the communications interface component 114 is operable with short range communication technologies such as by using near-field communication (NFC) tags.

A client device in the set of client devices 116 may represent any device executing computer-executable instructions. The client device in the set of client devices 116 may be implemented as a mobile computing device, such as, but not limited to, a wearable computing device, a mobile telephone, laptop, tablet, computing pad, netbook, gaming device, and/or any other portable device. A client device in the set of client devices 116 includes at least one processor and a memory. A client device may also include a user interface component.

A server in the set of servers 118 may be implemented as any type of computing device hosting one or more web services in a set of web services 120. A web service may include any type of service or application on a server made available to a client via the network 112. A server may include a blade server, a rack server, a cloud server, or any other type of computing device. Additionally, the computing device 102 may represent a group of processing units or other computing devices.

The system 100 may optionally include a data storage device 122 for storing data, such as, but not limited to threshold(s) 124 and/or a counter 126. The threshold(s) 124 include one or more per-service threshold values. Each threshold in the threshold(s) 124 is a threshold maximum number of service requests customized for a web service in the set of web services 120. For example, a first web service in the set of web services 120 may include a threshold of two-hundred while a second web service in the set of web services 120 may have a threshold value of three hundred.

The counter 126 is a data structure storing a per-service value representing the number of active requests 128 for each web service in the set of web services 120. An active request is a service request which has not yet been completed/resolved. In other words, an active request represents service requests to a web service which is currently being serviced/processed/handled by the web service.

The data storage device 122 may include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database, such as, but not limited to, the database 900 in FIG. 9.

The data storage device 122 in this example is included within the computing device 102 or associated with the computing device 102. In other examples, the data storage device 122 may be a remote data storage accessed by the computing device via the network 112, such as a remote data storage device, a data storage in a remote data center, or a cloud storage.

The memory 108 in some examples stores one or more computer-executable components. Exemplary components include a permission controller 130. The permission controller 130 is a controller that receives a set of one or more permission requests 132 from the set of client devices 116. In some examples, a permission request requesting permission associated with a first web service is received from a client by the communications interface component 114 via the network 112.

If the threshold for the first web service is greater than or equal to the counter value for the first web service, the permission controller 130 sends a permission 134 response to the requesting client. The requesting client in this example is an application. If permission 134 to utilize the first web service is received, the client sends a set of one or more service requests 136 to the first web service.

In some examples, if the counter 126 indicates the threshold number of service requests are currently active, the permission controller 130 sends a denial 138 response to the requesting client.

The threshold(s) 124 in some examples includes a plurality of thresholds for a single web service. Each threshold is applicable during a different time-period. In some examples, the threshold(s) 124 includes a first threshold maximum number of active requests applicable to a first time-period and a second threshold maximum number of active requests applicable during a second time-period. For example, the first time-period may be weekdays (Monday through Friday) and the second time-period may be weekends (Saturday and Sunday).

The permission server may compare the current number of active requests with the first threshold maximum number of active requests to determine whether to grant permission requests received during the first time-period. The permission server compares the current number of active requests with the second threshold maximum number of active requests to determine whether to grant permission requests received during the second time-period.

The type of web service request doesn't matter to the permission controller service. The permission controller service is a service performed, in some examples, by a permission controller component, such as, but not limited to, the permission controller 130 in FIG. 1, FIG. 2 and/or FIG. 3.

The service request may be any type of request, such as, but not limited to, an inventory data requests, a request to download data from a server, a request to upload data to a server, etc. The permission controller service does not identify what the request is, how much data utilization is associated with the service request, how much processor power is required, or if it is a resource intensive request. The permission controller service is agnostic with regard to the content of the web service request. If a permission request is received when the counter value is below the threshold number, the permission controller gives permission. Each web service has a different threshold allowed at a time.

The permission controller does not prevent clients from sending requests to web services and it does not forward requests to the web service. The permission controller monitors the number of requests going to the web services. If there are too many requests active, the permission controller service sends a denial (no) with a random sleep interval. The sleep interval may be any random amount of time, such as, but not limited to, two seconds, five seconds, fifty-six seconds, two minutes, five minutes, etc. If the client receives the denial, the client and waits for the assigned sleep time prior to resending the permission request. The permission request is resent when the sleep time expires. The permission controller assigns a different wait time for each permission request that is denied.

In this example, the web service and the permission controller component are executing on separate computing devices. In other examples, the permission controller may be running on the same computing device (server) as one or more of the web services being throttled by the permission controller.

Figure 2:
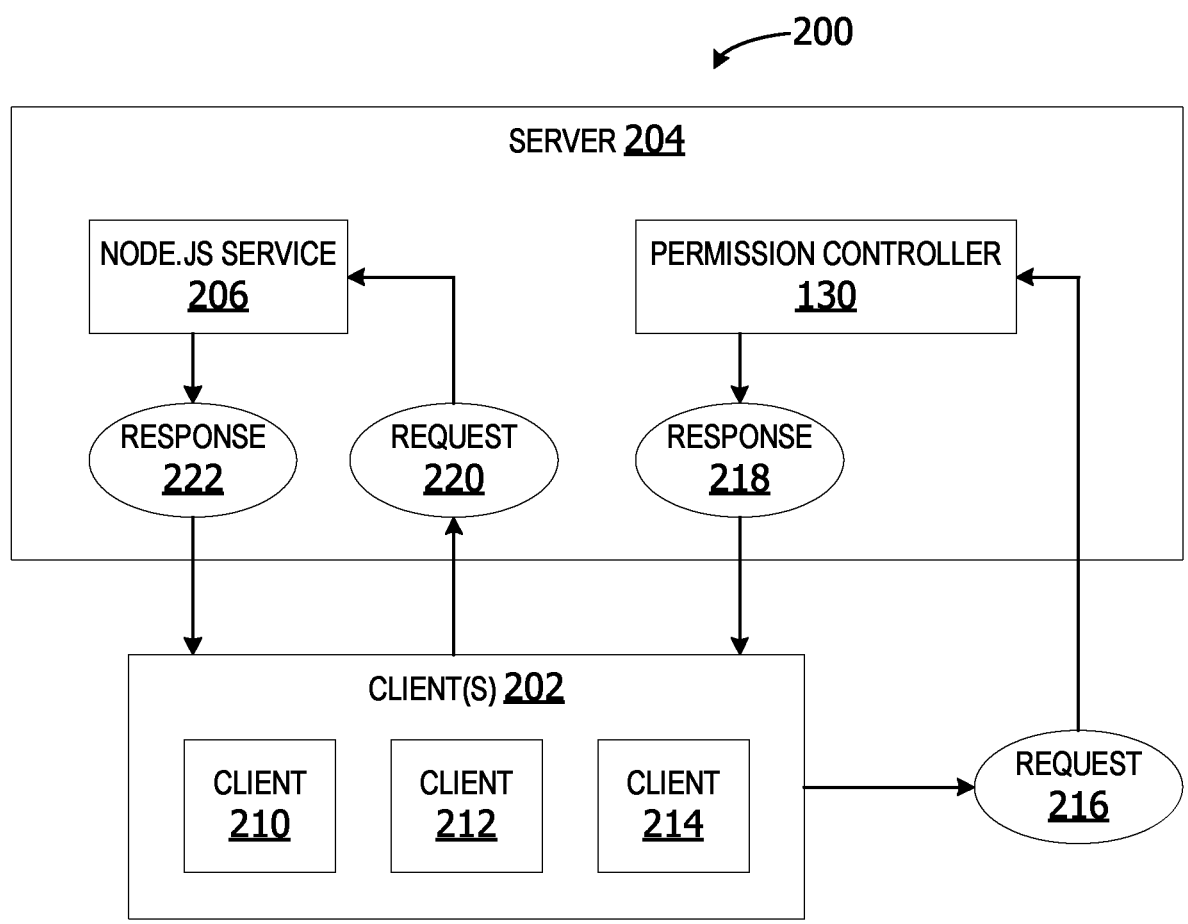
FIG. 2 is an exemplary block diagram illustrating a system for request permission control associated with a set of clients.

FIG. 2 is an exemplary block diagram illustrating a system 200 for request permission control associated with a set of clients 202. In this example, a server 204 hosts a NODE.JS® service 206 and a permission controller 130. A NODE.JS® service 206 is a web service provided on an open-source, cross-platform run-time environment for executing JAVA® script (JS) code on the server 204.

The client(s) 202 is a set of one or more applications running on a computing device, such as, but not limited to, the set of clients 116 in FIG. 1. The client(s) 202 may be running on a same computing device as the server 204 or on a remote computing device from the server 204. The server 204 is a computing device, such as, but not limited to, the computing device 204 in FIG. 2.

The client(s) 202 in this example, includes a first client 210, a second client 212 and a third client 214. However, in other examples, the client(s) 202 may include a single client, two clients, as well as four or more clients. For example, the client(s) 202 may include hundreds or thousands of different clients sending requests to the permission controller 130.

The permission controller 130 receives permission requests, such as the request 216, from a client in the client(s) 202. The permission controller 130 determines whether to grant the client 212 permission to proceed with sending request(s) to the selected web service. The determination is made based on the number of pervious permissions granted to other clients for this same selected web service which are still active/pending service requests.

The permission controller 130 sends a response 218 to the requesting client. For example, if the client 212 sent the request 216, the permission controller 130 sends the response 218 to the requesting client 212. If the response 218 is a denial of permission, the client 212 waits a random wait/delay time prior to resending the request 216. In some examples, the permission controller 130 sends a random wait time with the permission denial. In other examples, if the client receives a permission denial, the client generates the random wait time. The client 212 continues waiting and resending the request 216 until a permission response is received.

When a permission response is received, the client 212 sends a service request 220 to a web service associated with the NODE.JS® service 206. The NODE.JS® service 206 sends a response 222 associated with the service request 220. The client 212 determines if interactions with the selected web service are completed. If not, the client 212 may send another service request to the web service. However, if the client's service request has been completed satisfactorily and the client has no additional requests for the selected web service, the client 212 may send an acknowledge message back to the permission controller 130.

Figure 3:
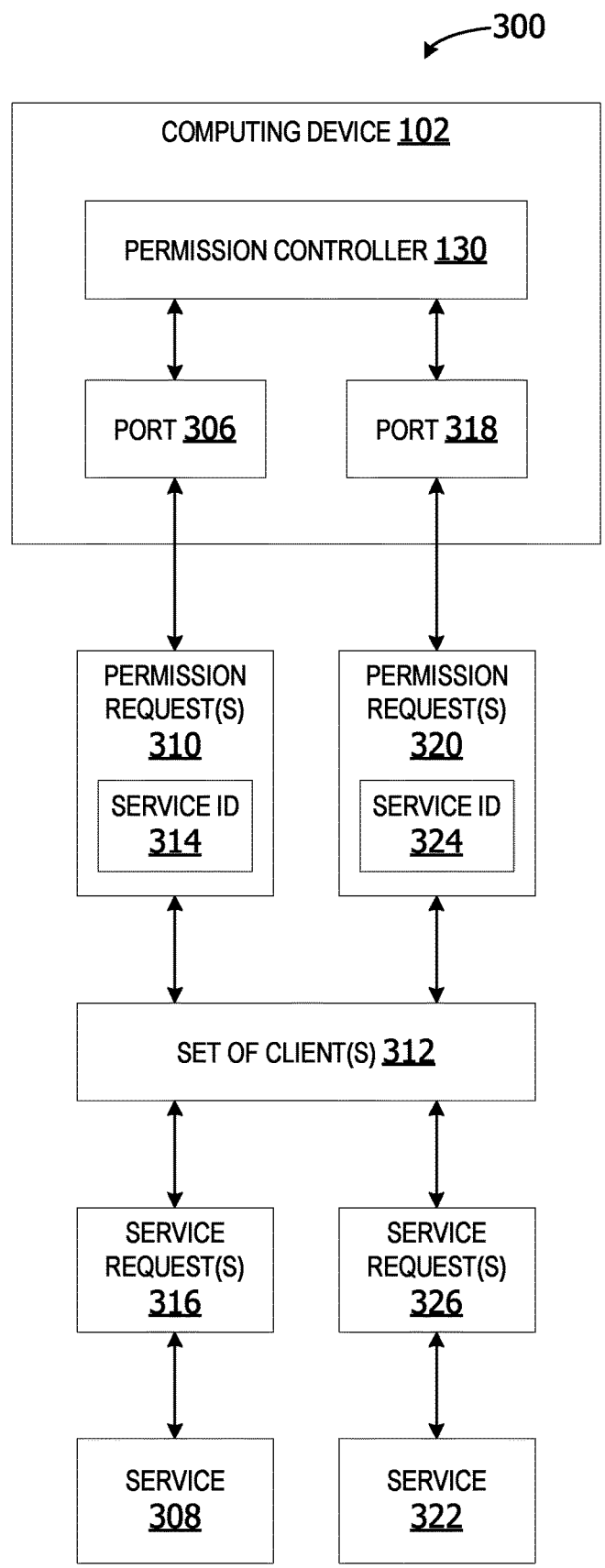
FIG. 3 is an exemplary block diagram illustrating a system including a permission server throttling requests associated with multiple web services.

FIG. 3 is an exemplary block diagram illustrating a system 300 including a permission controller 130 throttling requests associated with multiple web services. The permission controller 130 in this example is hosted on a computing device 102.

The permission controller 130 listens at a port associated with each web service in a set of one or more web services assigned to the permission controller. The permission controller 130 in this non-limiting example listens at port 306 associated with service 308 for permission request(s) 310 received from one or more clients in the set of clients 312. Each permission request in the permission request(s) 310 includes a service identifier (ID) 314 identifying the web service 308. All permission requests associated with the service 308 are received via the port 306. If the permission controller 130 grants permission to one or more of the permission request(s) 310, the client(s) receiving permission sends one or more service request(s) 316 to the service 308.

The permission controller 130 may manage requests for multiple web services. In this non-limiting example, the permission controller 130 also listens at port 318 for permission request(s) 320 associated with service 322. The service 322 is a different web service than the service 308. The permission request(s) 320 include a service ID 324 identifying the service 322. If one or more clients receive permission from the permission controller 130, the one or more clients send one or more service request(s) 326 to the service 322.

Figure 4:
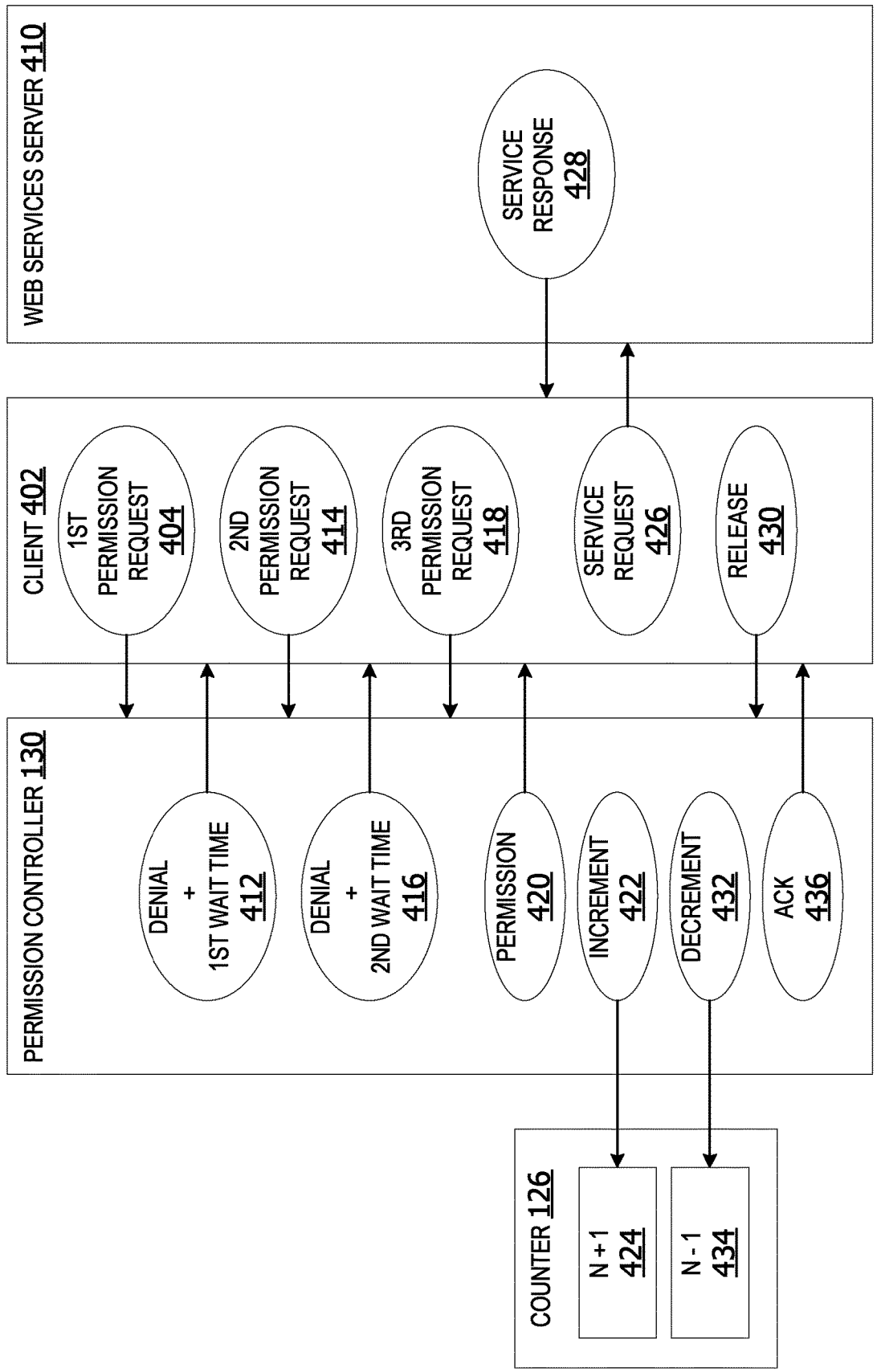
FIG. 4 is an exemplary block diagram illustrating a system for managing permission requests from a single client.

FIG. 4 is an exemplary block diagram illustrating a system 400 for managing permission requests from a single client 402. The client 402 sends a first permission request 404 requesting permission to utilize the web services server 410 to the permission controller 130. The permission controller 130 compares a current value of a counter 126 with a customized threshold for a web services server 410. If the counter value exceeds the threshold, the permission controller 130 sends a first denial and a first wait time 412 to the client 402. The first wait time is a random wait time generated by the permission controller 130.

After the first wait time expires, the client 402 sends a second permission request to utilize the web services server 410 to the permission controller 130. If the counter 126 still exceeds the threshold, the permission controller sends a second denial and a second wait time 416 to the client 402. After expiration of the second wait time, the client 402 sends a third permission request 418 to the permission controller 130. If the counter 126 value is less than or equal to the threshold value when the third permission request 418 is received, the permission controller sends a permission 420 response to the client 402 and increments 422 the counter 126 to increase the counter value "N" by one 424.

In some examples, when the client 402 receives the permission 420, the client sends a service request 426 to the web services server 410. The web services server 410 sends a service response 428 associated with the service request 426. For example, if the service request 426 is a request for data (read request), the service response 428 includes the requested data. In another example, if the service request 426 is a request to store data or update data stored on the web services server 410, the service response 428 includes an acknowledgement that the data was stored/updated successfully, or the write operation failed.

If the client is finished, the client 402 sends a release 430 to the permission controller 130 indicating that the client is no longer utilizing the web service (not an active request). The permission controller 130 performs a decrement 432 on the counter 126 to decrease the counter value "N" by one 434. The permission controller 130 sends an acknowledge (Ack) 436 to the client 402 acknowledging receipt of the release 430.

Figure 5:
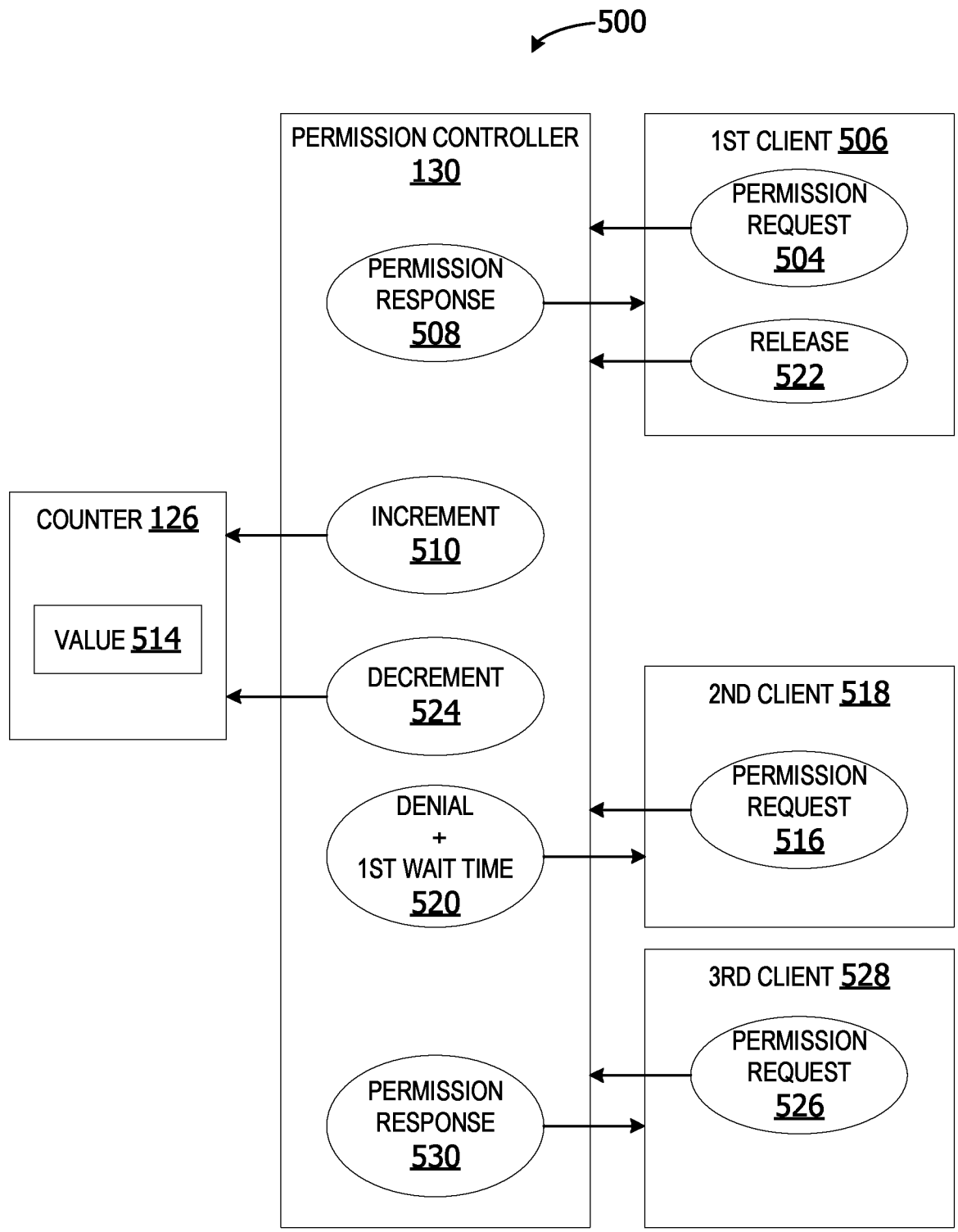
FIG. 5 is an exemplary block diagram illustrating a system for managing permission requests from multiple clients.

FIG. 5 is an exemplary block diagram illustrating a system 500 for managing permission requests from multiple clients. A permission controller 130 receives a first permission request 504 from a first client 506. The permission controller 130 may be running on the same server (computing device) as the first client 506 or on a separate server device.

The permission controller 130 sends a permission response 508. The permission response 508 may include a permission or a denial with a random wait time. If the permission response 508 is a permission, the permission controller 130 increments 510 a counter 126 value 514 associated with the web service.

The counter 126 value 514 is an integer value representing the number of active requests. For example, if the permission controller has granted permission to ten clients, the counter value is ten. In another example, if the permission controller has granted permission to one-hundred clients, the counter value is one-hundred.

The permission controller 130, in this example, receives a second permission request 516 from a second client 518. If the counter 126 value 514 exceeds the threshold value for the web service, the permission controller 130 sends a permission denial with a first wait time 520.

When the first client 506 receives a response from the web service and has no further service requests to send the web service, the first client 506 sends a release 522 message to the permission controller 130. Upon receiving the release 522, the permission controller 130 decrements 524 the counter 126 value 514. When a third permission request 526 is received from a third client 528, the permission controller 130 compares the threshold to the decremented counter value 514. If the counter value 514 is less than or equal to the threshold for the web service, the permission controller 130 sends a permission response 530 to the third client 528.

In this example, permission requests are not placed in a queue. The permission controller 130 sends a permission or a denial based on the counter value 514 when the request is received. If the counter value exceeds the threshold when the permission request is received, a denial response is sent. If the counter value is less than or equal to the threshold, a permission is sent.

Figure 6:
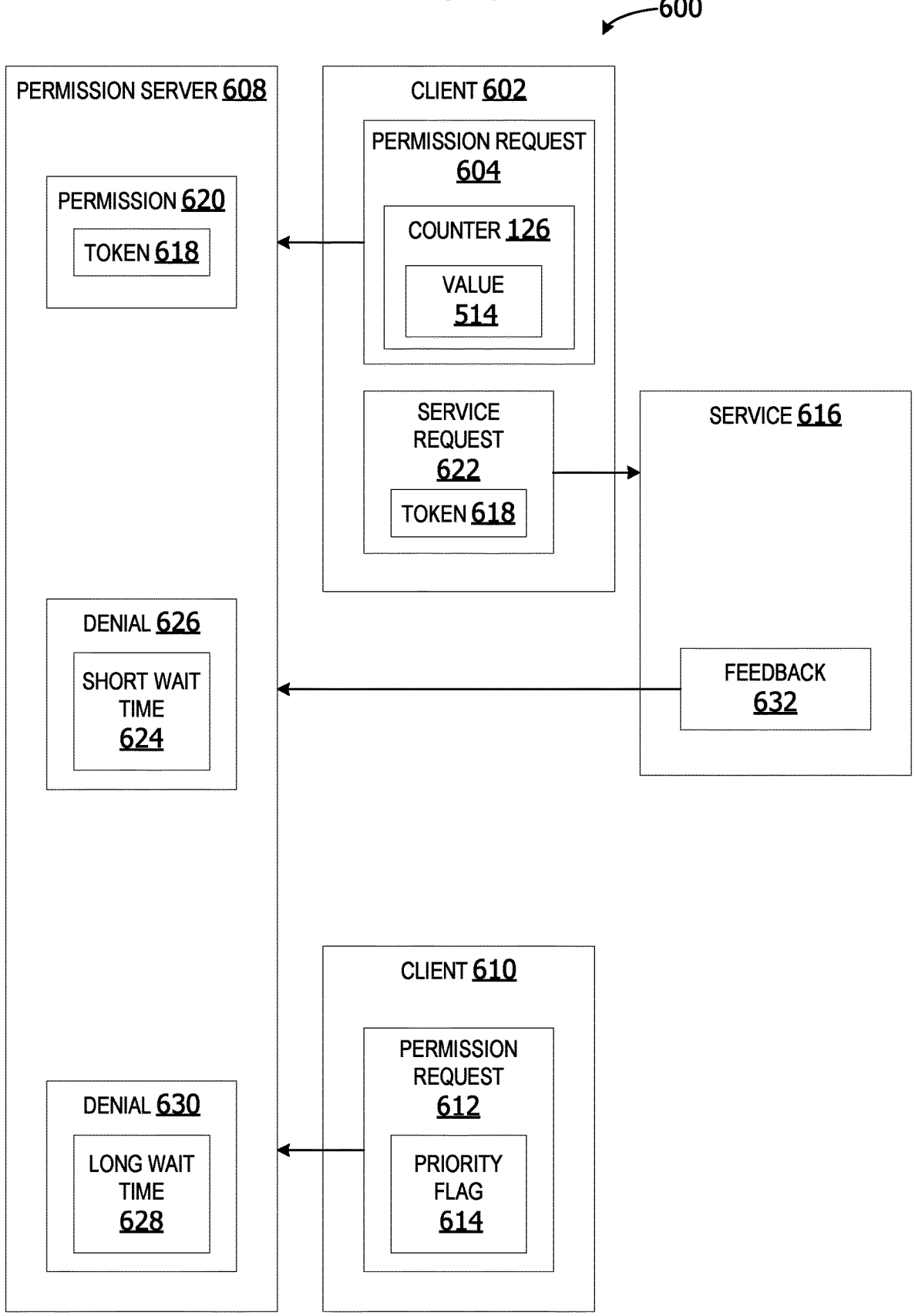
FIG. 6 is an exemplary block diagram illustrating a system for managing permission requests including a priority indicator.

FIG. 6 is an exemplary block diagram illustrating a system 600 for managing permission requests including a priority indicator. In some examples, a client 602 sends a permission request 604 including a counter 126 value 514 indicating the number of previous permission requests sent to the permission server 608 which have received a denial. If the client's counter 126 value 514 exceeds a threshold number of denials, the permission request 604 is identified as a priority request. The permission server 608 is a server running a permission service or permission controller.

In another example, a client 610 may send a permission request 612 requesting permission to utilize a service 616 which includes a priority flag 614 to the permission server 608. The priority flag indicates that the permission request 612 should be identified as a priority request.

In some examples, a priority request is a request that is granted permission when other non-priority requests are denied. In other examples, a number of permissions are reserved for priority requests. Priority requests received when the counter value 514 for the service 616 exceeds the threshold value are granted permissions until the number of reserved permissions are granted. In still other examples, a priority request is compared to a priority threshold number of active requests. The priority threshold may be higher than the non-priority threshold number of active requests.

In some examples, the permission server 608 sends a token 618 with a permission 620. The client 602 includes the token 618 with the service request 622 sent to the service 616. In these examples, the service 616 only responds to requests which include the token 618 indicating that the client received permission from the permission server 608.

The permission server 608 in some examples sends a denial 626 with a short wait time 624 where the number of active requests is greater than a first threshold number of active requests but less than a second threshold number of active requests indicating the number of active requests is close to the threshold number of active requests. In some examples, the randomizer component selects the random wait time interval from a set of short duration wait time intervals if the current number of active requests is greater than a first threshold maximum number of active requests and less than a second threshold maximum number of active requests The permission server 608 in other examples includes a long wait time 628 with a denial 630 response where the number of active requests for the service 616 is greater than both the first threshold number of active requests and a second number of active requests. In some examples, the randomizer component selects the random wait time interval from a second set of long duration wait time intervals on condition the current number of active requests is greater than both the first threshold maximum number of active requests and the second threshold maximum number of active requests.

In still other examples, the service 616 may send feedback 632 indicating whether the service 616 is experiencing lag time or receiving too many requests. This feedback 632 may be utilized by the permission server (permission controller) to adjust the threshold value(s) for the service 616 downward and reduce the number of active requests.

The service 616 in other examples sends feedback 632 indicating whether the service 616 is capable of receiving/ responding to more requests (unused resources/underutilized resources). This feedback 632 may be utilized by the permission server (permission controller) to adjust the threshold value(s) for the service 616 upward and increase the number of active requests.

Figure 7:
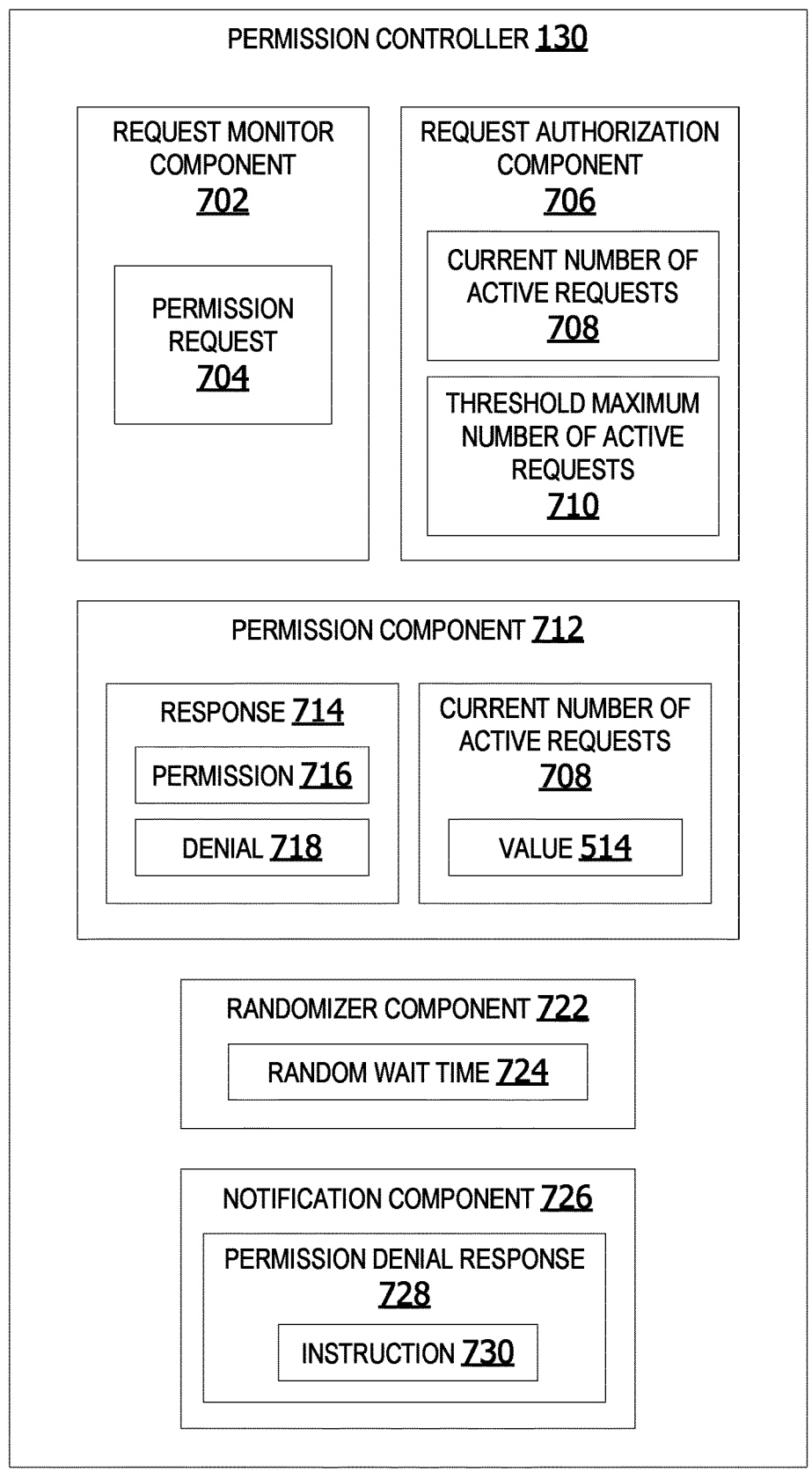
FIG. 7 is an exemplary block diagram illustrating a permission controller for handling permission requests.

FIG. 7 is an exemplary block diagram illustrating a permission controller 130 for handling permission requests. A request monitor component 702 receives a permission request 704 associated with a selected web service from a client via a network, such as, but not limited to, the network 112 in FIG. 1. In some non-limiting examples, the permission request 704 is a representational state transfer (REST) request.

A request authorization component 706 compares a current number of active requests 708 to the selected web service with a threshold maximum number of active requests 710 assigned to the selected web service. A permission component 712 generates a response 714 to the client. The response 714 may include a permission 716 or a denial 718. The permission 716 is granted if the threshold maximum number of active requests 710 exceeds the current number of active requests 708 to the selected web service. The permission 716 response grants the client permission to send a service request to the selected web service.

If the response 714 is a permission 716, the permission component 712 increments a counter value 514 representing the current number of active requests 708 to the selected web service. If the response is a denial 718, a randomizer component 722 generates a random wait time 724 associated with the selected web service. The denial 718 is sent to the requesting client with the random wait time 724.

A notification component 726 sends a permission denial response 728 with the random wait time 724 to the client on condition the current number of active requests 708 to the selected web service exceeds the threshold maximum number of active requests 710. The permission denial response 728 denies the client permission to send the service request to the selected web service. The permission denial response 728 in some examples includes an instruction 730 to the client to wait the random wait time 724 prior to resending the permission request associated with the selected web service.

Figure 8:
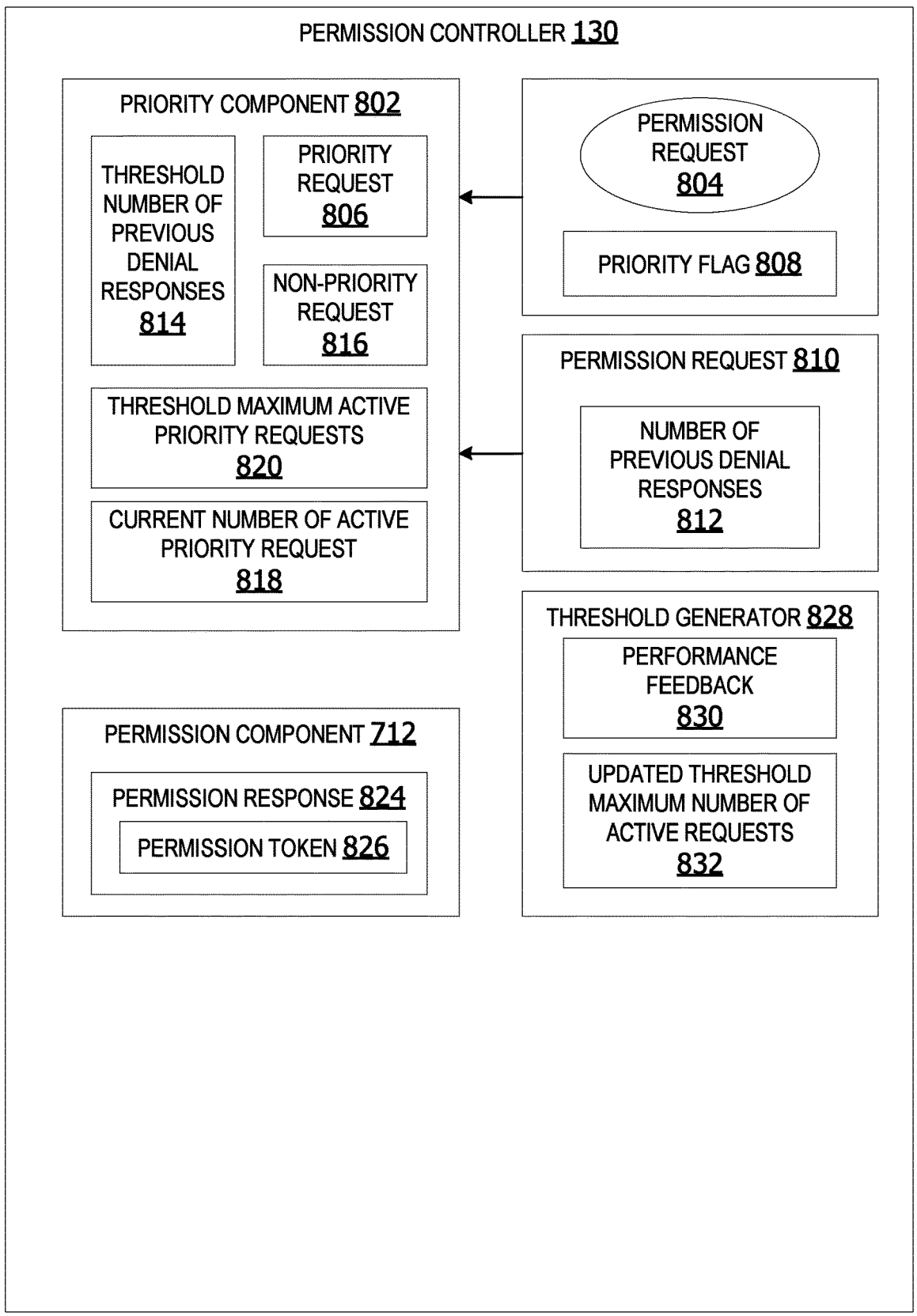
FIG. 8 is an exemplary block diagram illustrating a permission controller for prioritizing permission requests.

FIG. 8 is an exemplary block diagram illustrating a permission controller 130 for prioritizing permission requests. A priority component 802 identifies a permission request 804 as a priority request 806 if the permission request 804 includes a priority flag 808 or a permission request 810 includes a number of previous denial responses 812 exceeding a threshold number of previous denial responses 814. The number of previous denial responses 814 indicates a number of times the client has sent a permission request associated with the selected web service and received a denial response from the permission component. If the permission request is unaccompanied by a priority flag 808 or a counter value indicating the number of previous denial responses 812, the request is identified as a non-priority request 816.

The priority component 802 compares the current number of active priority requests 818 to a threshold maximum active priority requests 820 number. If the current number of active priority requests 818 is less than or equal to the threshold maximum active priority requests 820, the permission component 712 sends a permission response 824 to the client on condition the permission request 804 is identified as a priority request 806 and the threshold maximum active priority requests 820 exceeds the current number of active priority requests 818 to the selected web service.

In some examples, the permission component 712 sends the permission token 826 to the client 804 with the permission response 824. The selected web service in these examples accepts a web service request from the client 804 if the web service request includes the permission token 826.

A threshold generator 828 in some examples utilizes performance feedback to dynamically update the threshold maximum number of active requests associated with the selected web service. If the performance feedback 830 indicates the web service is experiencing lag, the threshold generator 828 creates updated threshold maximum number of active requests 832 that is a lower number than the previous threshold number of active requests to reduce the lag and improve overall performance.

Figure 9:
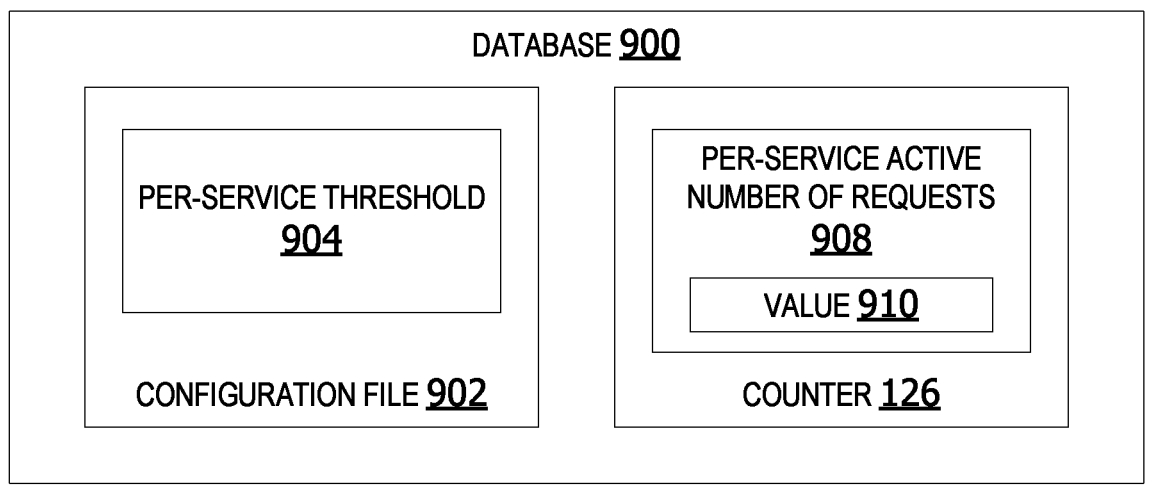
FIG. 9 is an exemplary block diagram illustrating a database.

FIG. 9 is an exemplary block diagram illustrating a database 900. The database 900 may be implemented on a storage, such as, but not limited to, the data storage device 122 in FIG. 1. The database in some examples stores a configuration file 902, including a per-service threshold 904 configured for each web service. The database 900 may optionally also include a counter 126 storing a per-service active number of requests 908 value 910.

Figure 10:
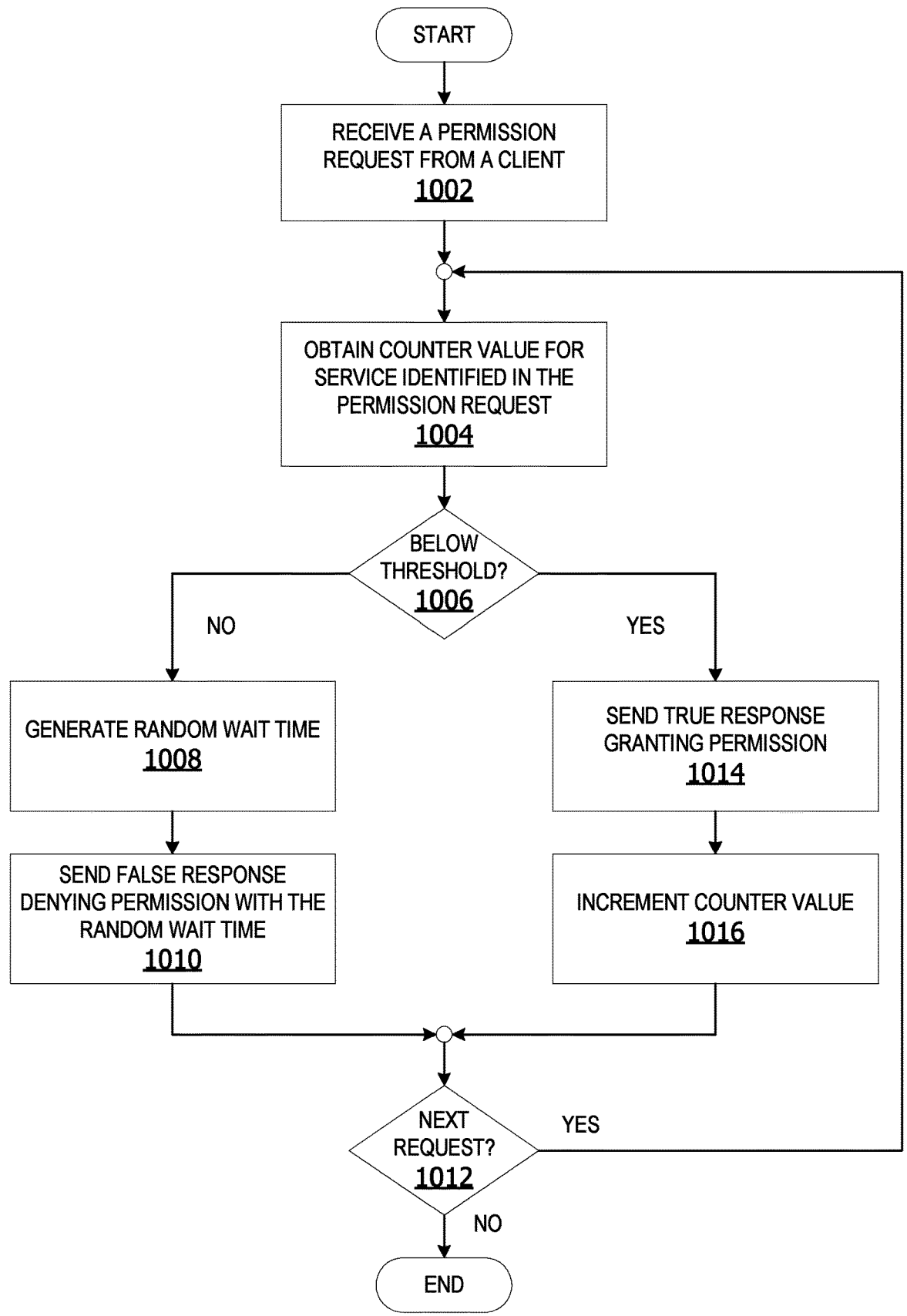
FIG. 10 is an exemplary flow chart illustrating operation of the computing device to manage permission requests associated with a web service.

FIG. 10 is an exemplary flow chart illustrating operation of the computing device to manage permission requests associated with a web service. The process shown in FIG. 10 may be performed by a permission controller component, executing on a computing device, such as the computing device 102 in FIG. 1, the server 204 in FIG. 2 and/or the computing device 102 in FIG. 3.

The process beings by receiving a permission request from a client at 1002. The permission controller obtains a counter value for the service identified in the permission request at 1004. The counter value is the value of a counter, such as, but not limited to, the value 514 in FIG. 5.

The counter value is an integer value representing a number of active service requests, such as, but not limited to, the counter 126 in FIG. 1. The counter value may be stored on a data store, such as the data storage device 122 in FIG. 1 and/or the database 900 in FIG. 9.

The permission controller determines whether the counter value is below a threshold at 1006. If no, the permission controller generates a random wait time at 1008. The permission controller sends a false response denying permission to the client with the random wait time at 1010. The permission controller determines whether a next request is received. If no, the process terminates thereafter.

Returning to 1006, if the counter value exceeds the threshold, the permission controller sends a true response granting permission to the client at 1014. The permission controller increments the counter value by one at 1016. The permission controller determines if a next request is received at 1012. If a next request is received, the permission controller iteratively performs operations 1006 through 1012 until no additional permission requests are received. The process terminates thereafter.

While the operations illustrated in FIG. 10 are performed by a computing device, aspects of the disclosure contemplate performance of the operations by other entities. For example, a cloud service may perform one or more of the operations.

Figure 11:
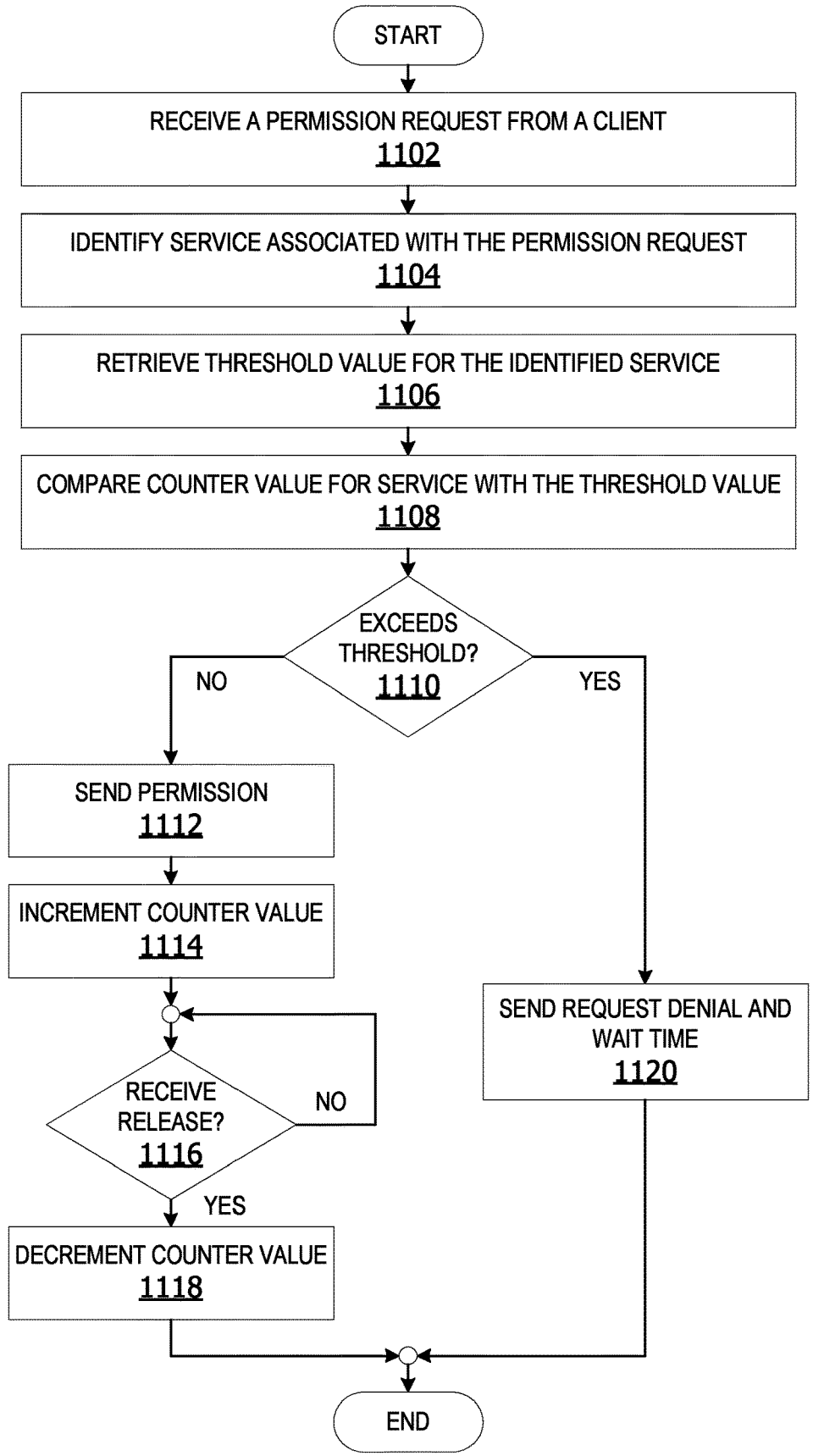
FIG. 11 is an exemplary flow chart illustrating operation of the computing device to utilize a counter for permission request handling.

FIG. 11 is an exemplary flow chart illustrating operation of the computing device to utilize a counter for permission request handling. The process shown in FIG. 10 may be performed by a permission controller component, executing on a computing device, such as the computing device 102 or the server 204 in FIG. 2.

The process begins by receiving a permission request from a client at 1102. The client may be a client on a client device, such as, but not limited to the set of client devices 116 in FIG. 1. The client may also be a client is a set of one or more client(s) 202 in FIG. 2. The permission controller identifies a service associated with the permission request at 1104. The permission controller retrieves a threshold value for the identified service at 1106. The permission controller compares a counter value for the service with the threshold value at 1108. The permission controller determines if the counter value exceeds the threshold at 1110. If no, the permission controller sends permission 1112 to the client. The permission controller increments the counter value by one at 1114. The permission controller determines if a release is received from the client at 1116. If yes, the permission controller decrements the counter value at 1118. The process terminates thereafter.

Returning to 1110, if the counter value does exceed the threshold, the permission controller sends a request denial and a random wait time at 1120. The process terminates thereafter.

While the operations illustrated in FIG. 11 are performed by a computing device, aspects of the disclosure contemplate performance of the operations by other entities. For example, a cloud service may perform one or more of the operations.

Figure 12:
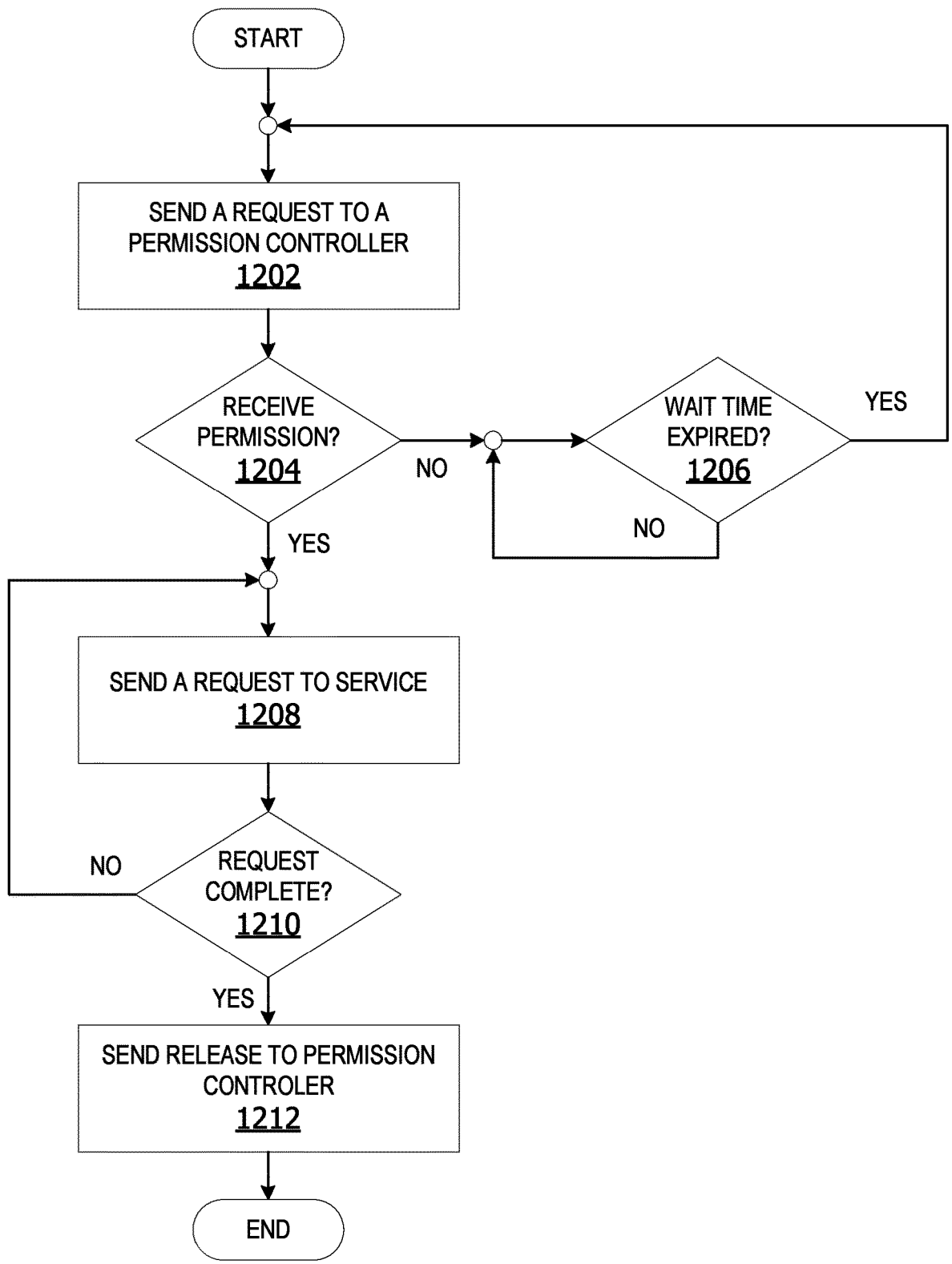
FIG. 12 is an exemplary flow chart illustrating operation of the computing device to obtain permission from a permission controller.

FIG. 12 is an exemplary flow chart illustrating operation of the computing device to obtain permission from a permission controller. The process shown in FIG. 10 may be performed by a client, executing on a computing device, such as the set of client devices 116 in FIG. 1 or the client(s) 202 in FIG. 2.

The process begins by sending a request to a permission controller at 1202. The permission controller determines if permission is received from the permission controller at 1204. If no, the client waits until the wait time is expired at 1206. When the wait time expires, the client resends the request to the permission controller at 1202. If the client receives permission at 1204, the client sends a request to the service at 1208. The client determines if the request is complete at 1210. If no, the client sends another request to the service.

If the service request is complete at 1210, the client sends a release to the permission controller. The process terminates thereafter.

While the operations illustrated in FIG. 12 are performed by a computing device, aspects of the disclosure contemplate performance of the operations by other entities. For example, a cloud service may perform one or more of the operations.

Figure 13:
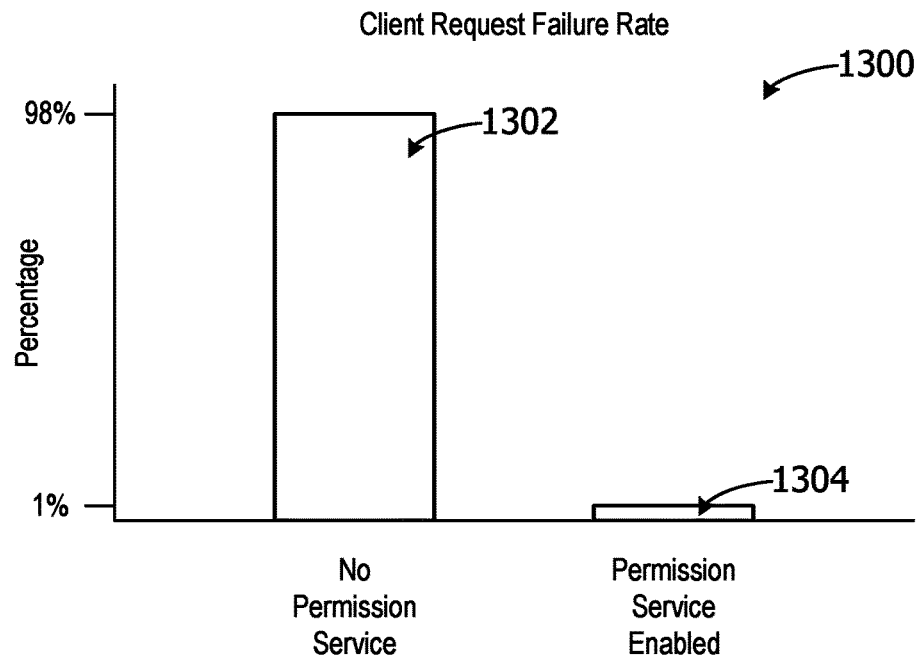
FIG. 13 is an exemplary graph illustrating client request failure rate with and without permission service.

FIG. 13 is an exemplary graph 1300 illustrating client request failure rate with and without permission service. Before implementing the permission controller service, client requests to web services were experiencing client failure of up to 98% as shown at 1302. This failure was due to too many connections on the server, so some were being closed and other connections were simply timing out.

After implementing the permission service, the failure rate dropped down to less than one percent (<1%) as shown at 1304. The less than one percent (>1%) failure rate is simply a tuning issue. If the threshold maximum number of requests granted is reduced, the failure rate may be further reduced to zero.

Figure 14:
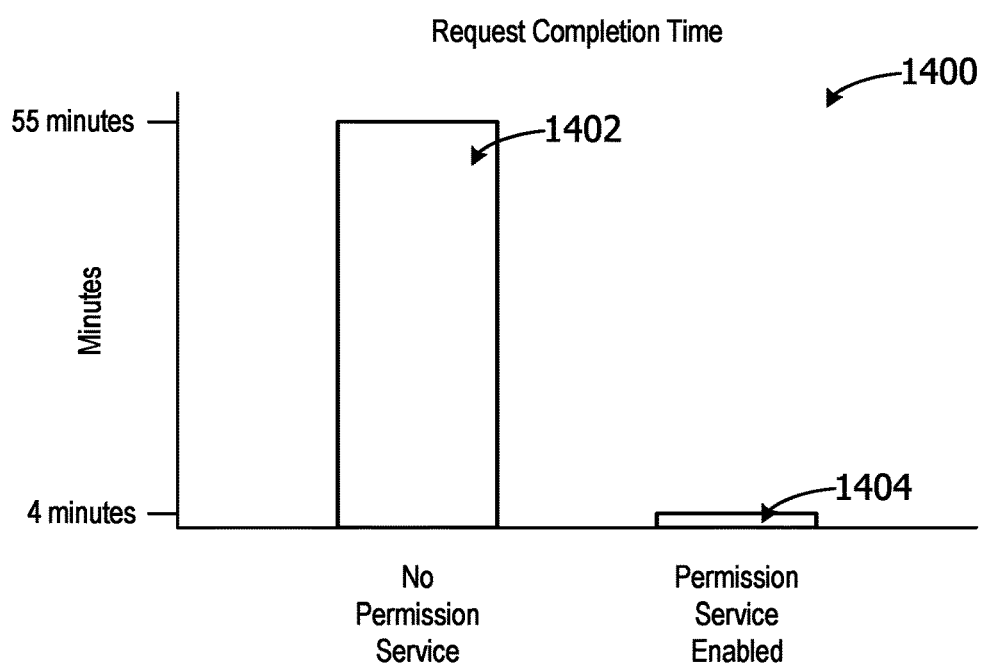
FIG. 14 is an exemplary graph illustrating client request failure rate with and without permission service.

FIG. 14 is an exemplary graph 1400 illustrating client request failure rate with and without permission service. Prior to implementing the permission controller service, a service request took on average fifty minutes to fifty-five minutes to completely process a single service request in the web service. When the service took fifty minutes or longer to finish, the client would frequently fail and continue to send the data to the service every four hours (six times a day). This resulted in server response lag time, inefficient utilization of server resources and service failure.

After enabling the permission service, client request completion time reduced to only two minutes to four minutes on average. This is an improvement of two-thousand five hundred percent (2500%) from a single run and only one run is necessary to complete requests with the permission controller service in charge. The permission controller service throttles the requests to a service to prevent overloading the service and server used by the client(s).

The permission controller service allows a web service to handle a larger load than it would normally be able to do with normal node JS code. The permission controller service throttles service requests without partitioning, gatekeeping, load balancing, or token systems.

The permission controller service prevents overloading the service with too many requests at one time. The permission controller service in some examples can receive requests from thousands of clients (two-thousand or more) that all start up at the same time. The permission controller service enables significant improvement in request completion time and increased service request capacity.

Additional Examples

In some examples, the permission service (permission controller) listens to the port assigned to a given web service and waits to receive a permission request. When a client makes a REST call to the permission service to request permission, the permission service checks whether the request is within the allowable number of clients. This threshold value is set in a configuration file. A simple integer variable (counter value) is used to keep track of the number of clients granted permission. The integer variable is incremented or decremented as determined by the type of request. If the message is a request which is granted, the counter value is incremented. If the message is a release, the counter value is decremented.

If the client request is within the allowable number of clients, the permission service grants permission by sending back a TRUE response to the client making the request. If the service has already reached the maximum number of clients, the permission controller rejects the permission by returning a FALSE response, which includes a random wait time for the client to wait/sleep (if it chooses to use it) before requesting permission again.

The threshold maximum number in some examples is assigned according to the needs of the service being managed. A lower threshold number is utilized for more complex services that do a lot of work. A higher threshold number of active requests may be utilized for simpler services.

When the client has completed all its requests to a particular web service, the client sends a message to release its place. When the permission service receives the release, it decrements the active requests counter value to release/ free-up a spot for another permission request.

In a non-limiting example scenario, the permission controller service neither grants access to the server/service nor serves as a load balancer. The permission controller service doesn't deny access to the service it is set up to manage. A client may go straight to the service and not use the permission service. However, failure to utilize the permission service results in failure most of the time for the client.

In another example, if a client receives a permission denial (no) with a three second wait time, the client waits the three seconds and then resends the permission request to the permission controller service. If there are still too many requests, the permission controller service sends another denial with a new random sleep time, for example thirty-four seconds. After the thirty-four second wait, the client resends the request. If the number of active request is now below the threshold maximum number, the permission controller service sends an approval (permission grant) and the client then sends a different web services request to a web service.

The permission controller service may throttle requests for multiple different web services. The permission controller may run on the same server or different server from the web services. The permission server may also run on a cloud server.

The per-service threshold maximum number of active requests is configurable. If a web service receives a lot of processor/data intensive requests, the threshold number of is automatically lowered to reduce the number of active requests. In other words, the per-service threshold may be set based on the type of requests received by each web service.

In some examples, a client tracks the number of permission requests sent/number of permission denials received from the permission controller. The client sends a flag or indicator with the permission request indicating how many times denied. The permission controller in these examples prioritizes a request that has waited a long time or been denied a threshold number of times. In this manner, the permission controller does not monitor clients sending requests or count requests from each client. The counting of permission requests by the client is performed by the client. This reduces processor load on the permission controller service.

The permission controller service provides dynamic modification of threshold values in other examples. The permission controller uses a configuration file/list of web services with a unique threshold for each web service. The permission controller service uploads the configuration file and reads the threshold for each web service when it turns on. A user may dynamically add or delete web services and change thresholds using the configuration file. This makes permission control configurable.

Alternatively, or in addition to the other examples described herein, examples include any combination of the following:
- the permission component, implemented on the at least one processor, decrements an integer value representing the current number of active requests to the selected web service in response to receiving a release notification from the client;
- wherein the threshold maximum number of active requests is a threshold maximum number of non-priority requests;
- a priority component, implemented on the at least one processor, that identifies the permission request as a priority request on condition the permission request includes a priority flag, or the permission request includes a number of previous denial responses exceeding a threshold number of previous denial responses;
- wherein the number of previous denial responses indicates a number of times the client has sent a permission request associated with the selected web service and received a denial response from the threshold;
- the permission component, implemented on the at least one processor, that sends a permission response to the client on condition the permission request is identified as a priority request and a threshold maximum active priority requests exceeds a current number of active priority requests to the selected web service;
- a permission token, wherein the permission component sends the permission token to the client with the permission response;
- wherein the selected web service accepts a web service request from the client if the web service request includes the permission token, wherein the selected web service ignores any web service request received from the client without the permission token;
- wherein the random wait time interval is a first random wait time interval;
- the randomizer component, implemented on the at least one processor, that generates a second random wait time interval that is a different time-period than the first random wait time interval, wherein the second random wait time interval is sent to the client with a second denial response on condition a second permission request is received from the client and the current number of active requests to the selected web service continues to exceed the threshold maximum number of active requests;
- a threshold generator, implemented on the at least one processor, that dynamically updates the threshold maximum number of active requests associated with the selected web service based on performance feedback associated with the selected web service;
- the randomizer component, implemented on the at least one processor, that selects the random wait time interval from a first set of short duration wait time intervals on condition the current number of active requests is greater than a first threshold maximum number of active requests and less than a second threshold maximum number of active requests;
- the randomizer component, implemented on the at least one processor, that selects the random wait time interval from a second set of long duration wait time intervals on condition the current number of active requests is greater than both the first threshold maximum number of active requests and the second threshold maximum number of active requests;
- a plurality of threshold maximum active request values associated with the selected web service, wherein the plurality of threshold maximum active request values comprises a first threshold maximum number of active requests applicable to a first time-period and a second threshold maximum number of active requests applicable to a second time-period;
- wherein the permission server compares the current number of active requests with the first threshold maximum number of active requests to determine whether to grant permission requests received during the first time-period;
- wherein the permission server compares the current number of active requests with the second threshold maximum number of active requests to determine whether to grant permission requests received during the second time-period;
- the permission component, implemented on the at least one processor, compares a first number of active requests associated with a first web service with a first threshold maximum number of active requests to determine whether to grant permission to a first client requesting permission to utilize the first web service;
- the permission component, implemented on the at least one processor, compares a second number of active requests associated with a second web service with a second threshold maximum number of active requests to determine whether to grant permission to a second client requesting permission to utilize the second web service;
- wherein a different threshold number of active requests is assigned to each web service in a plurality of web services;

incrementing the first counter value by one in response to sending the permission response associated with the first web service to the first client device;
decrementing the first counter value by one in response to receiving the release notification associated with the first web service;
incrementing the second counter value by one in response to receiving the release notification associated with the second web service;
decrementing the second counter value by one in response to receiving the release notification associated with the second web service;
receiving a third permission request associated with the first web service from the first client device;
generating, by the randomizer component, a third random wait time;
outputting a second denial response with the third random wait time to the first client device on condition the first counter value exceeds the first threshold maximum active requests;
selecting, by the randomizer component, a random wait time from a first set of short duration wait time intervals on condition a counter value is greater than a first threshold maximum number of active requests and less than a second threshold maximum number of active requests;
selecting the random wait time from a second set of long duration wait time intervals on condition the counter value is greater than both the first threshold maximum number of active requests and the second threshold maximum number of active requests;
identifying a permission request as a priority request on condition the permission request includes a priority flag, or the permission request includes a number of previous denial responses exceeding a threshold number of previous denial responses, wherein the number of previous denial responses indicates a number of times the client has sent a permission request associated with the selected web service and received a denial response from the permission component;
comparing a priority threshold maximum active requests associated with a selected web service with a priority counter value indicating a current number of active priority requests associated with the selected web service on condition the permission request is identified as the priority request;
sending a permission response to a client device associated with the permission request on condition the threshold maximum active priority requests exceeds the priority counter value associated with the selected web service;
sending a permission token with the permission response, wherein a selected web service accepts a web service request from a client device if the web service request is accompanied by the permission token, wherein the selected web service ignores web service requests unaccompanied by the permission token;
receiving performance feedback associated with a selected web service;
dynamically updating a threshold maximum number of active requests associated with the selected web service based on the received performance feedback, wherein the threshold maximum number of active requests is lowered in response to negative performance feedback;
comparing the first counter value associated with the first web service with the first threshold maximum number of active requests to determine whether to grant a permission request received during a first time-period;
comparing the first counter value associated with the first web service with a third threshold maximum number of active requests to determine whether to grant a permission request received during a second time-period;
sending a priority flag with the permission request to the permission server, the priority flag indicating a priority of the permission request;
incrementing an integer value associated with a denial counter by one in response to receiving a denial response from the permission server, the integer value representing the number of denial responses received in response to the first permission request; and
re-sending the first permission request, including the integer value associated with the denial counter, to the permission server on occurrence of a wait time associated with the denial response.

At least a portion of the functionality of the various elements in FIG. 1, FIG. 2, FIG. 3, FIG. 4, FIG. 5, FIG. 6, FIG. 7, FIG. 8, and FIG. 9 may be performed by other elements in FIG. 1, FIG. 2, FIG. 3, FIG. 4, FIG. 5, FIG. 6, FIG. 7, FIG. 8, and FIG. 9, or an entity (e.g., processor, web service, server, application program, computing device, etc.) not shown in FIG. 1, FIG. 2, FIG. 3, FIG. 4, FIG. 5, FIG. 6, FIG. 7, FIG. 8, and FIG. 9.

In some examples, the operations illustrated in FIG. 10, FIG. 11 and FIG. 12 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing a permission controller service. For example, the elements illustrated in FIG. 1, FIG. 2, FIG. 3, FIG. 4, FIG. 5, FIG. 6, FIG. 7, FIG. 8 and FIG. 9, such as when encoded to perform the operations illustrated in FIG. 10, FIG. 11 and FIG. 12, constitute exemplary means for receiving a first permission request associated with a first web service from a first client device and a second permission request associated with a second web service from a second client device via a network; exemplary means for sending a first permission response to the first client device on condition a first threshold maximum active requests associated with the first web service exceeds a first counter value indicating a current number of active requests associated with the first web service; exemplary means for generating a first random wait time for the first client device to wait prior to resending the first permission request; exemplary means for outputting a first denial response, including the first random wait time, to the first client device on condition the first counter value exceeds the first threshold maximum active requests; exemplary means for sending a second permission response to the second client device on condition a second threshold maximum active requests associated with the second web service exceeds a second counter value indicating the current number of active requests associated with the second web service; exemplary means for generating a second random wait time; and exemplary means for outputting a second denial response, including the second random wait time, to the second client device on condition the second counter value exceeds the second threshold maximum active requests.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized request permission control, the system comprising:
   a memory;
   at least one processor communicatively coupled to the memory;
   a request monitor component, implemented on the at least one processor, that receives a first permission request associated with a selected web service from a client via a network;
   a request authorization component, implemented on the at least one processor, that compares a current number of active requests to the selected web service with a threshold maximum number of active requests assigned to the selected web service;
   a permission component, implemented on the at least one processor, that generates a permission response to the client via the network and increments the current number of active requests to the selected web service on condition the threshold maximum number of active requests exceeds the current number of active requests to the selected web service, the permission response granting the client permission to send a service request to the selected web service;

a randomizer component, implemented on the at least one processor, that generates a first random wait time interval associated with the selected web service; and a notification component, implemented on the at least one processor, that sends a first denial response with the first random wait time interval to the client on condition the current number of active requests to the selected web service exceeds the threshold maximum number of active requests, the first permission denial response denying the client permission to send the service request to the selected web service and comprising an instruction to the client to wait the first random wait time interval prior to sending a second permission request associated with the selected web service, wherein the randomizer component generates a second random wait time interval that is selected from a different duration time-period than the first random wait time interval, and wherein the second random wait time interval is sent to the client with a second denial response on condition the second permission request is received from the client and the current number of active requests to the selected web service continues to exceed the threshold maximum number of active requests.

2. The system of claim 1, further comprising:
the permission component, implemented on the at least one processor, decrements an integer value representing the current number of active requests to the selected web service in response to receiving a release notification from the client.

3. The system of claim 1, wherein the threshold maximum number of active requests is a threshold maximum number of non-priority requests and further comprising:
a priority component, implemented on the at least one processor, that identifies the permission request as a priority request on condition the permission request includes a priority flag or the permission request includes a number of previous denial responses exceeding a threshold number of previous denial responses, wherein the number of previous denial responses indicates a number of times the client has sent the permission request associated with the selected web service and received the permission denial response from the permission component; and
the permission component, implemented on the at least one processor, that sends the permission response to the client on condition the permission request is identified as the priority request and a threshold maximum number of active priority requests exceeds a current number of active priority requests to the selected web service.

4. The system of claim 1, further comprising:
a permission token, wherein the permission component sends the permission token to the client with the permission response, wherein the selected web service accepts the service request from the client if the service request includes the permission token, wherein the selected web service ignores any service request received from the client without the permission token.

5. The system of claim 1, further comprising:
a threshold generator, implemented on the at least one processor, that dynamically updates the threshold maximum number of active requests associated with the selected web service based on performance feedback associated with the selected web service.

6. The system of claim 1, further comprising:
the randomizer component, implemented on the at least one processor, that selects the first random wait time interval from a first set of short duration wait time intervals on condition the current number of active requests is greater than a first threshold maximum number of active requests and less than a second threshold maximum number of active requests; and
the randomizer component, implemented on the at least one processor, that selects the second random wait time interval from a second set of long duration wait time intervals on condition the current number of active requests is greater than both the first threshold maximum number of active requests and the second threshold maximum number of active requests.

7. The system of claim 1, further comprising:
a plurality of threshold maximum active request values associated with the selected web service, wherein the plurality of threshold maximum active request values comprises a first threshold maximum number of active requests applicable to a first time-period and a second threshold maximum number of active requests applicable to a second time-period, wherein the permission component compares the current number of active requests with the first threshold maximum number of active requests to determine whether to grant permission requests received during the first time-period, and wherein the permission component compares the current number of active requests with the second threshold maximum number of active requests to determine whether to grant the permission requests received during the second time-period.

8. The system of claim 1, further comprising:
the permission component, implemented on the at least one processor, compares a first number of active requests associated with a first web service with a first threshold maximum number of active requests to determine whether to grant permission to a first client requesting permission to utilize the first web service; and
the permission component, implemented on the at least one processor, compares a second number of active requests associated with a second web service with a second threshold maximum number of active requests to determine whether to grant permission to a second client requesting permission to utilize the second web service, wherein a different threshold number of active requests is assigned to each web service in a plurality of web services.

9. A computer-implemented method for customized request permission control, the computer-implemented method comprising:
receiving, by a communications interface component, a first permission request associated with a first web service from a first client device and a second permission request associated with a second web service from a second client device via a network;
sending, by a permission component, a first permission response to the first client device on condition a first threshold maximum active requests associated with the first web service exceeds a first counter value indicating a current number of active requests associated with the first web service, the first granting permission to send a service request to the first web service;
generating, by a randomizer component, a first random wait time interval for the first client device to wait prior to sending a second permission request;

outputting a first denial response, including the first random wait time interval, to the first client device on condition the first counter value exceeds the first threshold maximum active requests;

sending, by the permission component, a second permission response to the second client device on condition a second threshold maximum active requests associated with the second web service exceeds a second counter value indicating the current number of active requests associated with the second web service;

generating, by the randomizer component, a second random wait time interval that is selected from a different duration time-period than the first random wait time interval; and outputting a second denial response, including the second random wait time interval, to the second client device on condition the second counter value exceeds the second threshold maximum active requests.

10. The computer-implemented method of claim 9, further comprising:

incrementing the first counter value by one in response to sending the first permission response associated with the first web service to the first client device;

decrementing the first counter value by one in response to receiving a release notification associated with the first web service;

incrementing the second counter value by one in response to receiving the release notification associated with the second web service; and decrementing the second counter value by one in response to receiving the release notification associated with the second web service.

11. The computer-implemented method of claim 9, further comprising:

receiving a third permission request associated with the first web service from the first client device;

generating, by the randomizer component, a third random wait time interval; and outputting the second denial response with the third random wait time interval to the first client device on condition the first counter value exceeds the first threshold maximum active requests.

12. The computer-implemented method of claim 9, further comprising:

selecting, by the randomizer component, the first random wait time interval from a first set of short duration wait time interval on condition a counter value is greater than a first threshold maximum number of active requests and less than a second threshold maximum number of active requests; and selecting the second random wait time interval from the second set of long duration wait time interval on condition the counter value is greater than both the first threshold maximum number of active requests and the second threshold maximum number of active requests.

13. The computer-implemented method of claim 9, further comprising:

identifying a given permission request as a priority request on condition the given permission request includes a priority flag, or the given permission request includes a number of previous denial responses exceeding a threshold number of previous denial responses, wherein the number of previous denial responses indicates a number of times a given client has sent the given permission request associated with the selected web service and received a denial response from the permission component;

comparing a priority threshold maximum active requests associated with the selected web service with a priority counter value indicating a current number of active priority requests associated with the selected web service on condition the given permission request is identified as the priority request; and sending a permission response to a client device associated with the given permission request on condition a threshold maximum active priority requests exceeds the priority counter value associated with the selected web service.

14. The computer-implemented method of claim 9, further comprising:

sending a permission token with a permission response, wherein the selected web service accepts the service request from a client device if the service request is accompanied by the permission token, wherein the selected web service ignores service requests unaccompanied by the permission token.

15. The computer-implemented method of claim 9, further comprising:

receiving performance feedback associated with the selected web service; and dynamically updating a threshold maximum number of active requests associated with the selected web service based on the received performance feedback, wherein the threshold maximum number of active requests is lowered in response to negative performance feedback.

16. The computer-implemented method of claim 9, further comprising:

comparing the first counter value associated with the first web service with the first threshold maximum number of active requests to determine whether to grant a permission request received during a first time-period; and comparing the first counter value associated with the first web service with a third threshold maximum number of active requests to determine whether to grant the permission request received during a second time-period.

* * * * *